US008201228B2

(12) United States Patent
Hare et al.

(10) Patent No.: US 8,201,228 B2
(45) Date of Patent: Jun. 12, 2012

(54) SYSTEM AND METHOD FOR SECURING A NETWORK

(75) Inventors: Michael Hare, Plano, TX (US); Nimer I. Yaseen, Allen, TX (US); Richard J. Dunsmore, McKinney, TX (US)

(73) Assignee: Fujitsu Limited, Kawasaki (JP)

( * ) Notice: Subject to any disclaimer, the term of this patent is extended or adjusted under 35 U.S.C. 154(b) by 687 days.

(21) Appl. No.: 12/235,772

(22) Filed: Sep. 23, 2008

(65) Prior Publication Data

US 2010/0077460 A1 Mar. 25, 2010

(51) Int. Cl.
*G06F 21/00* (2006.01)

(52) U.S. Cl. ......... 726/5; 726/2; 726/3; 726/4; 713/165; 713/166; 713/167; 713/168; 370/252

(58) Field of Classification Search .................. 726/2–5; 713/165–168; 370/252
See application file for complete search history.

(56) References Cited

U.S. PATENT DOCUMENTS

| 6,240,518 | B1* | 5/2001 | Ooki et al. ................... 726/4 |
| 7,424,533 | B1* | 9/2008 | Di Benedetto et al. ....... 709/226 |
| 7,873,153 | B2* | 1/2011 | Bukovec et al. ......... 379/220.01 |
| 7,954,163 | B2* | 5/2011 | Smith ............................. 726/28 |
| 2003/0028674 | A1* | 2/2003 | Boden ........................... 709/250 |
| 2003/0163510 | A1* | 8/2003 | Janssen ......................... 709/100 |
| 2005/0055573 | A1* | 3/2005 | Smith ........................... 713/201 |
| 2005/0102536 | A1* | 5/2005 | Patrick et al. ................. 713/201 |
| 2005/0131901 | A1* | 6/2005 | Richter ........................... 707/10 |
| 2008/0209417 | A1* | 8/2008 | Jakobson ....................... 718/100 |
| 2008/0235776 | A1* | 9/2008 | Nakatomi et al. ................. 726/7 |

OTHER PUBLICATIONS

*Operations Application Messages—Network Element and Network System Security Administration Messages* (A Module of OTGR, FR-NWT-000439), Technical Reference TR-NWT-000835, Issue 3, Section 12.5 of OTGR (Operations Technology Generic Requirements), Bellcore, 140 total pages, Jan. 1993.
*Generic Requirements for Network Element/Network System (NE/NS) Security* (A Module of OTGR, FR-439; LSSGR, FR-64; and LECTRL, FD-LECKIT), Telcordia Technologies Generic Requirements, GR-815-CORE, Issue 2, 102 total pages, Mar. 2002.
Hill, Brian P., *User Security Management Feature Requirements Specification*, Document No. PDD-4441, Revision 3.1, Fujitsu, 155 total pages, Jan. 12, 2008.

* cited by examiner

*Primary Examiner* — Kambiz Zand
*Assistant Examiner* — Tongoc Tran
(74) *Attorney, Agent, or Firm* — Baker Botts L.L.P.

(57) ABSTRACT

A method of securing a telecom network, the operation of the telecom network controlled using a plurality of telecom network commands, includes grouping at least some of the plurality of telecom network commands into a plurality of different task sets. Each task set includes one or more telecom network commands. The method further includes grouping at least some of a plurality of users into a plurality of different user groups. In addition, the method includes each user group to the plurality of task sets. The method also includes allowing the at least one user access to the plurality of telecom network commands based on the association of each user group to the plurality of task sets.

12 Claims, 7 Drawing Sheets

SYSTEM AND METHOD FOR SECURING A NETWORK

TECHNICAL FIELD

This invention relates generally to network systems and more particularly to a system and method for securing a network.

BACKGROUND

In various networks, such as telecom networks, it is desirable to control access to telecom network commands on the network by users. One solution to this need is Telecordia's Transaction Language 1 (TL-1) security standard which utilizes UPC (Usage Privilege Code)/APC (Access Privilege Code) system. In this model, users are assigned an APC with a value from between 1 and 4; telecom network commands are assigned a UPC with the same value range. A user's APC must be greater than or equal to the command's UPC for that user to be able to execute that command. This implies that a user with an APC value of 3 may be able to access telecom network commands with UPC values of between 1-3. Further, a user with an APC value of 4 may access any command on the network. The standard implementation of the UPC/APC system requires that at least one user be given an APC value of 4.

This model suffers, though, because it is inflexible. As an example, if a technician needs access to only a few telecom network commands with UPC value 4, this technician must be given an APC value of 4 which means that the technician has access to all the telecom network commands in the network. However, this is a security risk since the technician only needs access to certain telecom network commands to perform their role, in this example. Thus, the inflexibility of this system does not allow for customization, such as the creation of niche roles for users on the network.

SUMMARY

A method of securing a telecom network, the operation of the telecom network controlled using a plurality of telecom network commands, includes grouping at least some of the plurality of telecom network commands into a plurality of different task sets. Each task set includes one or more telecom network commands. The method further includes grouping at least some of a plurality of users into a plurality of different user groups. In addition, the method includes each user group to the plurality of task sets. The method also includes allowing the at least one user access to the plurality of telecom network commands based on the association of each user group to the plurality of task sets.

The method may include grouping at least some of the task sets into a plurality of different task groups with each task group comprising one or more task sets. Further, the method may include associating each user group to at least one task group. Even further, the method may include allowing at least one user access to the plurality of telecom network commands based on the association between at least one user group and at least one task group.

An apparatus coupled to a telecom network includes a memory and a processor. The memory includes a user list which comprises a plurality of users of the telecom network; a user group list which comprises a plurality of user groups wherein each user group comprises at least one user of the plurality of users; a command list which comprises a plurality of telecom network commands of the telecom network; and a task set list which comprises a plurality of task sets wherein each task set comprises at least one telecom network command. The processor is configured to receive a request to access a first telecom network command of the plurality of telecom network commands from a first user of the plurality of users of the telecom network. Further, it is configured to identify a first set of user groups from the plurality of user groups which comprises the first user. In addition, it is configured to identify a first set of task sets from the plurality of task sets wherein each task set of the first set of task sets is associated with at least one user group of first set of user groups. Moreover, the processor is configured to allow the first user access to the first telecom network command if the first set of task sets comprises the first telecom network command.

Depending on the specific features implemented, particular embodiments may exhibit some, none, or all of the following technical advantages. Niche roles may be provided to users of the network providing greater security. Further, the UPC/APC model may be implemented, in various embodiments, which would provide backwards compatibility. Other technical advantages will be readily apparent to one skilled in the art from the following figures, description and claims.

DETAILED DESCRIPTION

Figure 1:
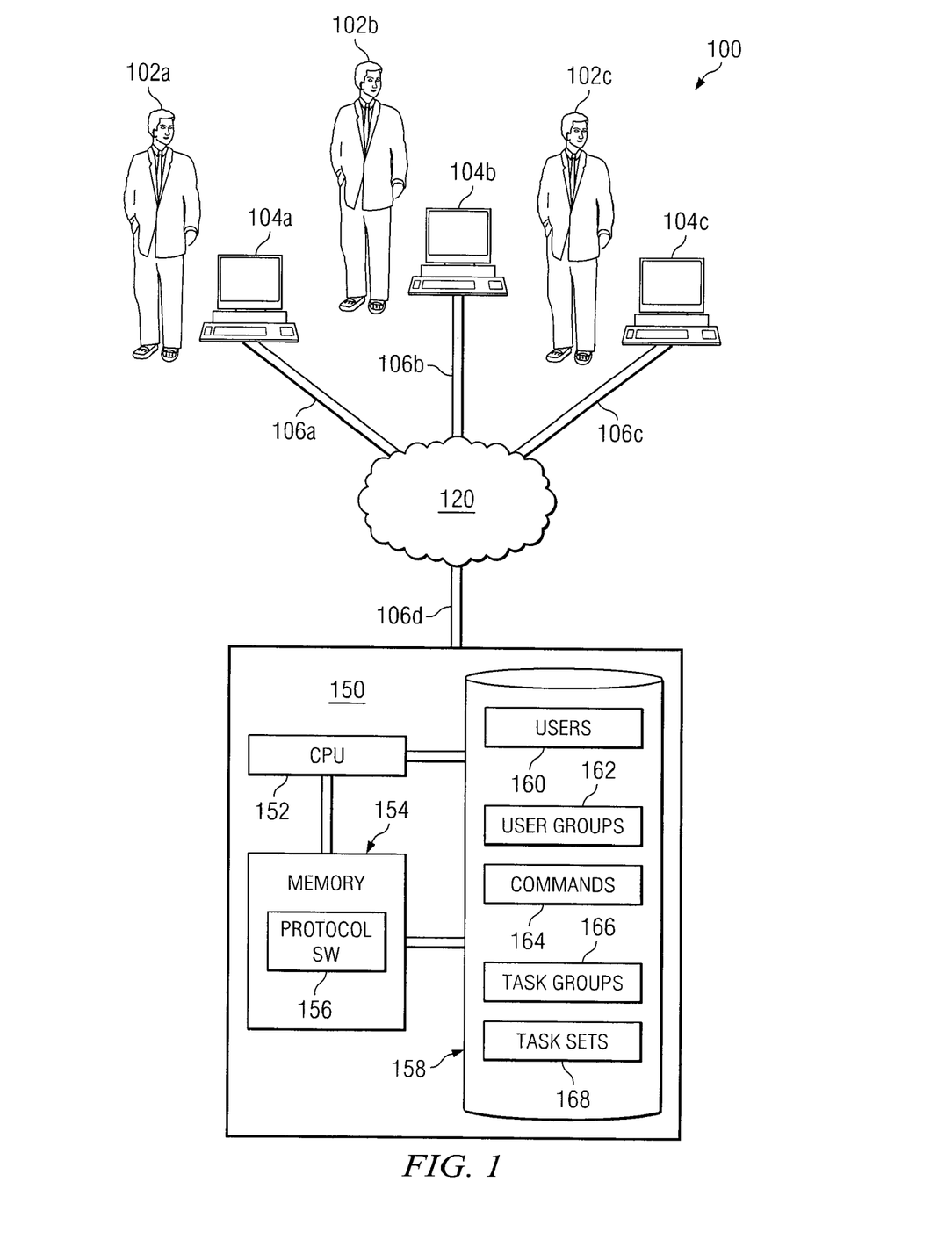
FIG. 1 illustrates one embodiment of a telecom network.

FIG. 1 illustrates one embodiment of telecom network 100. In some embodiments, users 102a-c are associated with nodes 104a-c, respectively. Nodes 104a-c are coupled using connections 106a-c to network 120, respectively. In particular embodiments, network management system (NMS) 150 is also coupled to network 120 via connection 106d. When a user, such as user 102a, would like to execute a command in telecom network 100, in various embodiments, NMS 150 must first verify that the user has permissions to execute the command. In particular embodiments, if the user has permission to execute the command, NMS 150 will allow the command to be executed in telecom network 100. In some embodiments, if the user does not have permissions to execute the command, NMS 150 will not allow the command to be executed in telecom network 100.

NMS 150, in various embodiments, includes processor 152, memory 154, and database 158. Note that functionality of NMS may be centrally located (as shown) or may be distributed (e.g. in the nodes). In particular embodiments, memory 154 includes protocol software 156, which may be operable to administer telecom network commands within telecom network 100. In some embodiments, protocol software 156 may allow or deny the execution of telecom network commands on telecom network 100. Database 158 includes, in some embodiments, user list 160, user group list 162, command list 164, task group list 166, and task set list 168. In various embodiments, user list 160 includes all of the users that may initiate telecom network commands in telecom network 100. In certain embodiments, command list 164 includes all the telecom network commands defined for use in telecom network 100. User group list 162, in some embodiments, contains groups of users in telecom network 100. Task set list 168, in various embodiments, contains sets of telecom network commands within telecom network 100, such as TL-1 commands. Task group list 166 includes a list of task groups defined for telecom network 100. By use of database 158 and the lists contained therein, protocol software 156 may, in some embodiments, implement a role based security model for telecom network 100.

Users 102 may, in various embodiments, be end users, administrators, or other entities using resources in telecom network 100. In particular embodiments, users 102 may be devices or systems which are controlled by software, such as firmware. These devices or systems may also be configured by other persons that may or not may not be part of users 102.

Nodes 104 may, in some embodiments, be telecom equipment, such as switches and routers. Nodes 104 may also be other equipment configured to interact with entities within telecom network 100, such as servers or gateways.

Connections 106 may, in particular embodiments, be any combination of wired or wireless communication. This may include optical, electrical, and electromagnetic transmission. In addition, connections 106 may include telephone or power lines.

Network 120 may, in certain embodiments, be a communicative platform operable to exchange data or information emanating from users 102. Network 120 could be a plain old telephone system (POTS). In other embodiments, network 120 could be any packet data network offering a communications interface or exchange between any two nodes in telecom network 100. Network 120 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment, including a combination of any networks or systems described above.

NMS 150 may, in various embodiments, be operable to receive and to communicate information to nodes 104. NMS 150 may, in certain embodiments, be a telecom network device. In some embodiments, NMS 150 may comprise a plurality of servers or other equipment, each performing different or the same functions in order to receive and communicate information to nodes 104. NMS 150 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

Memory 154 and database 158 may include files, stacks, databases, or other suitable forms of data. Memory 154 and database 158 may be random access memory, read-only memory, CD-ROM, removable memory devices or other suitable devices that allow storage and/or retrieval of data. Memory 154 and database 158 may be interchangeable and may perform the same functions.

Processor 152 is operable to execute the logic of programs stored in memory 154 or databases 158. Any type of processor may be used without departing from the teachings of the invention.

Figure 2:
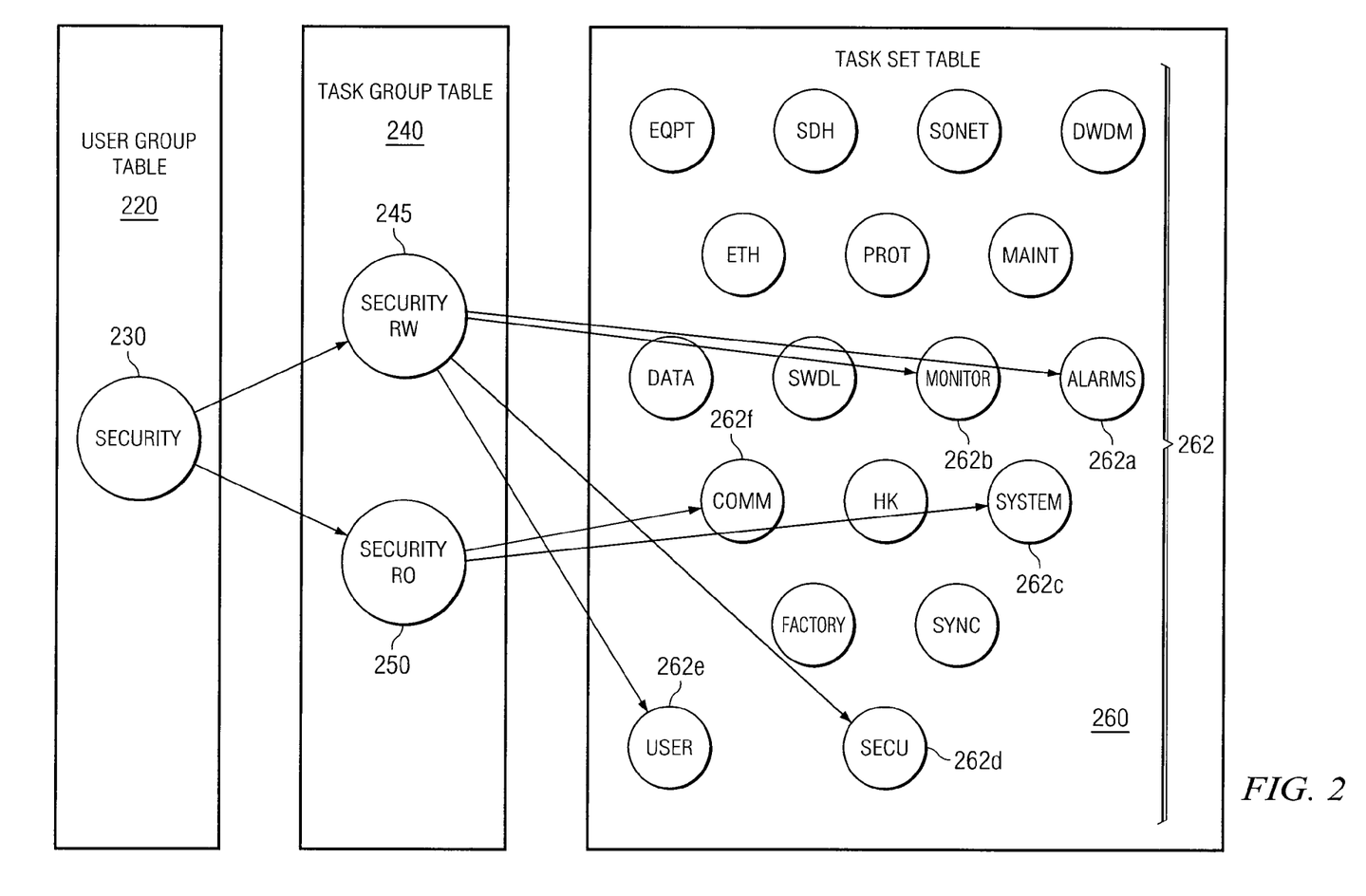
FIG. 2 illustrates one embodiment of a role based security model for the telecom network of FIG. 1.

FIG. 2 illustrates one embodiment of a role based security model for telecom network 100 utilizing user group table 220, task group table 240, and task set table 260. In some embodiments, user group table 220 contains all of the user groups defined for telecom network 100. In various embodiments, user group table 220 may be stored in database 158 and, in particular, may be stored in user group list 162. In the depicted embodiment, user group table 220 includes user group 230 which is labeled security. User group 230, in this example, contains the list of users who fit within the role of accomplishing tasks related to security in telecom network 100. In some embodiments, users in user group 230 may need access to telecom network commands in order to accomplish their roles as members of the security user group. In some embodiments, telecom network commands that user group 230 may need access to are accessed via task groups 245 and 250. Task groups 245 and 250, in various embodiments, are part of task group table 240. In some embodiments, task group table 240 is stored in database 158 and, in particular, table 240 may be stored within task group list 166. In the depicted embodiment, the security user group 230 is associated with security read-only task group 250 and security read-write task group 245. In some embodiments, task groups 245 and 250 define the type of access as well as the category of access to telecom network commands on telecom network 100. Thus, for example, since security user group 230 is associated with read-write security task group 245, users in security user group 230 have read-write access to telecom network commands associated with security task group 245. In this example, however, association with security read-only task group 250 only provides user group 230 with read access to telecom network commands associated with read-only task group 250.

Task set table 260 includes a plurality of task sets 262. In some embodiments, task set table 260 may be stored in database 158 and, in particular, task set table 260 may be stored in task set list 168. Each task set 262 (such as 262a, 262b, and 262c) is associated with, in particular embodiments, at least one command of telecom network 100. Thus, in some embodiments, telecom network commands that are executed in telecom network 100 are grouped into task sets 262. In various embodiments, these telecom network commands are stored in database 158 and, in particular, these telecom network commands may be stored in command list 164. Associating task groups 245 and 250 with task sets 262a-f, in some embodiments, provides user group 230 with access to telecom network commands on telecom network 100. Thus, in the depicted embodiment, security read-write task group 245 is associated with alarms task set 262a, monitor task set 262b, security task set 262d, and user task set 262e. Those associations give, in this example, read-write access to user group 230 for task sets 262a, b, d, and e. As illustrated in this example, task group 250 is associated with task set 262c and 262f. Thus, continuing the example, user group 230 has read-only access to communication task set 262f and system task set 262c.

Note that although a security "role" is shown, task groups or user groups can be formed for any number of suitable user roles. In some embodiments, this may be done by assessing which telecom network commands a role needs access to and forming at least one task group which is associated with task sets that contain these telecom network commands. Further, in various embodiments, at least one user group may be associated with the formed task groups and users may be associated with the formed user group in order to fulfill the desired role.

Figure 3:
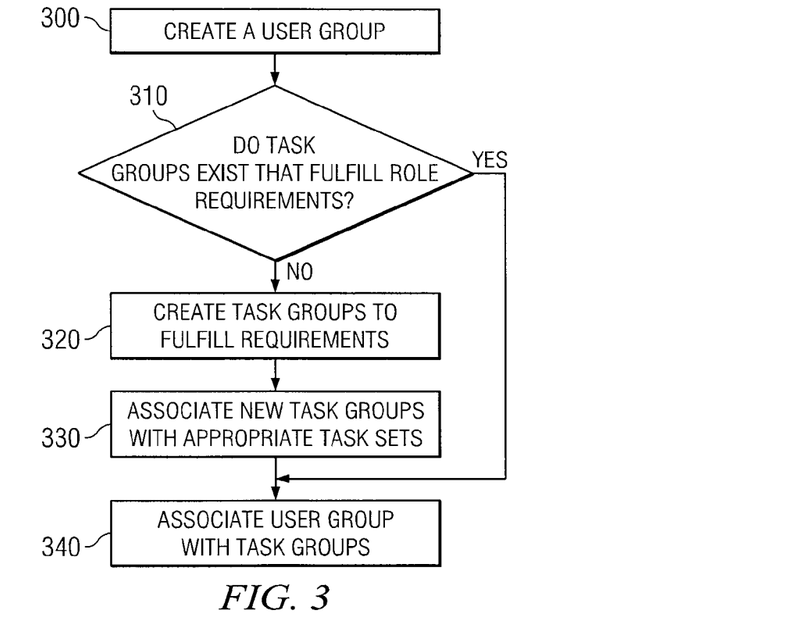
FIG. 3 depicts a flow chart describing one embodiment of how a role may be created in the telecom network of FIG. 1.

FIG. 3 depicts a flow chart describing one embodiment of how a role may be created in telecom network 100. In general, the steps illustrated in FIG. 3 may be combined, modified, or deleted where appropriate, and additional steps may also be added to the example operation. Furthermore, the described steps may be performed in any suitable order. In various embodiments, roles may be created in order to accomplish goals in a network, such as telecom network 100. To accomplish such goals, users may need access to certain telecom network commands in the network. In step 300, a user group is created to fulfill the desired role (such as the security group described above). In some embodiments, users selected to fulfill the desired role will be associated with the created user group in step 300. In step 310, in various embodiments, existing task groups (if any exist) are analyzed to determine if the telecom network commands they give access to fulfill the requirements of the desired role. If there are one or more task groups that fulfill the requirements to access telecom network commands as the desired role demands, then the created user group in step 300 may be associated, in particular embodiments, with the one or more task groups that fulfill the requirements of the role as indicated in step 340. However, in some embodiments, the current set of task groups will not provide the requisite access to command on telecom network 100 that the role requires. In such embodiments, task groups may be created to fulfill the requirements as indicated in step 320. In some embodiments, creating one or more task groups as described in steps 320 and 330 includes creating names for the one or more task groups as well as associating newly created one or more task groups, which each include one or more telecom network commands, with one or more task sets. These names and associations, in some embodiments, of the newly created one or more task groups may be stored in database 158 and, in particular, in task group list 166. Further, in some embodiments, the task sets to which the newly recreated one or more task groups are associated with may be stored in database 158 and, in particular, task set list 168. In various embodiments after the task groups have been created as in step 320 and 330 and the newly created task groups are associated with task sets in step 330 such that the one or more task groups may fulfill the requirements of the role, the newly created user group of step 300 may be associated with the newly created task groups of step 320 in step 340. Thus, an advantage is realized in that permissions a given user is granted may be customized and niche roles may be created without compromising the security of the network.

Figure 4:
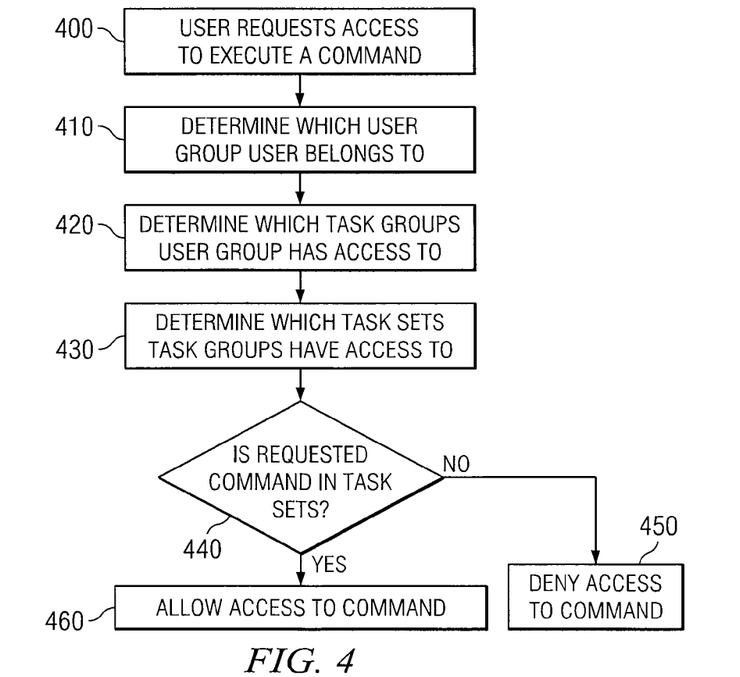
FIG. 4 illustrates a flow chart describing one embodiment of how a user may access a command.

FIG. 4 illustrates a flow chart describing one embodiment of how a user may access a command. In general, the steps illustrated in FIG. 4 may be combined, modified, or deleted where appropriate, and additional steps may also be added to the example operation. Furthermore, the described steps may be performed in any suitable order. In some embodiments, a user of telecom network 100 requests access to execute a command in step 400. In order to determine whether or not access should be granted to the user to execute the command, in particular embodiments, it must be determined to which user group the user belongs to, as depicted in step 410. In some embodiments, this determination is made by protocol software 156 which may utilize databases 160 and 162. Further, it may be determined which task groups the user groups are associated with in step 420. In particular embodiments, this determination is made by protocol software 156 which may utilize databases 162 and 166. In some embodiments, the task groups identified in step 420 are analyzed to determine which task sets they are associated in step 430. This determination, in various embodiments, is made by protocol software 156 which may utilize databases 166 and 168. In step 440, the task sets identified in step 430 are analyzed, in certain embodiments, to determine if any have access to any the command requested in step 400. If none of the task sets identified in step 430 contain access to the requested command, then, in particular embodiments, access will not be granted to the user to execute the command as depicted in step 450. In some embodiments, this analysis occurs in protocol software 156 which may utilize databases 166 and 168. However, if any of the task sets identified in step 430 are associated with the requested command, then, in various embodiments, the user will be allowed access to execute the command as depicted in step 460.

FIGS. 5-8 depict one embodiment of how the UPC/APC security architecture may be implemented using role-based security. This may be advantageous, in particular embodiments, in that it provides backwards compatibility. Further, in some embodiments, this may also be advantageous because it may ease deployment of the security model in existing architectures. Further, in various embodiments, the role-based security system allows for the UPC/APC architecture to be implemented alongside other security models, which would allow for niche roles to be created even while using the UPC/APC architecture.

Figure 5:
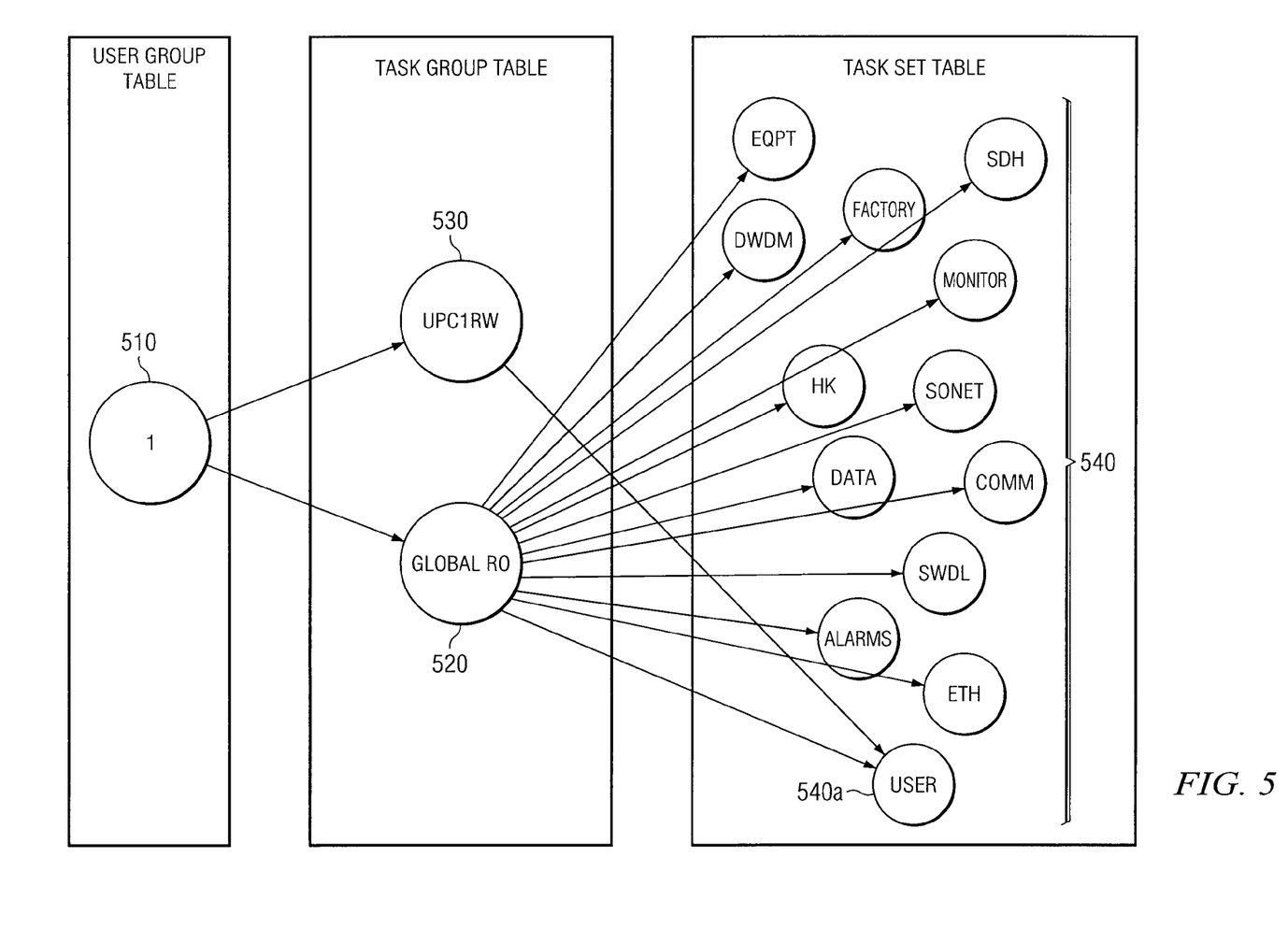
FIG. 5 depicts one embodiment of how UPC level 1 security architecture may be implemented using role based security.

FIG. 5 depicts one embodiment of how UPC level 1 security architecture may be implemented using role based security. User group 510 includes users, in some embodiments, which belong to UPC security level 1. Task groups 520 and 530, in certain embodiments, grant access to telecom network commands in telecom network 100 that are allowed in UPC security level 1. For example, task group 520 may be configured to grant read-only access to telecom network commands in telecom network 100 as dictated by UPC security level 1. In various embodiments, task group 530 grants read-write access to telecom network commands in telecom network 100 as dictated by UPC security level 1. In some embodiments, task set collection 540 includes task sets which comprise telecom network commands in telecom network 100. Thus, in various embodiments, users in user group 510 have read-write access to telecom network commands in task set 540a because user group 510 is associated with task group 530 which grants read-write access to user task set 540a. In some embodiments, user group 510 has read only access to all task sets within task set collection 540 because of the association between user group 510 and task group 520.

Figure 6:
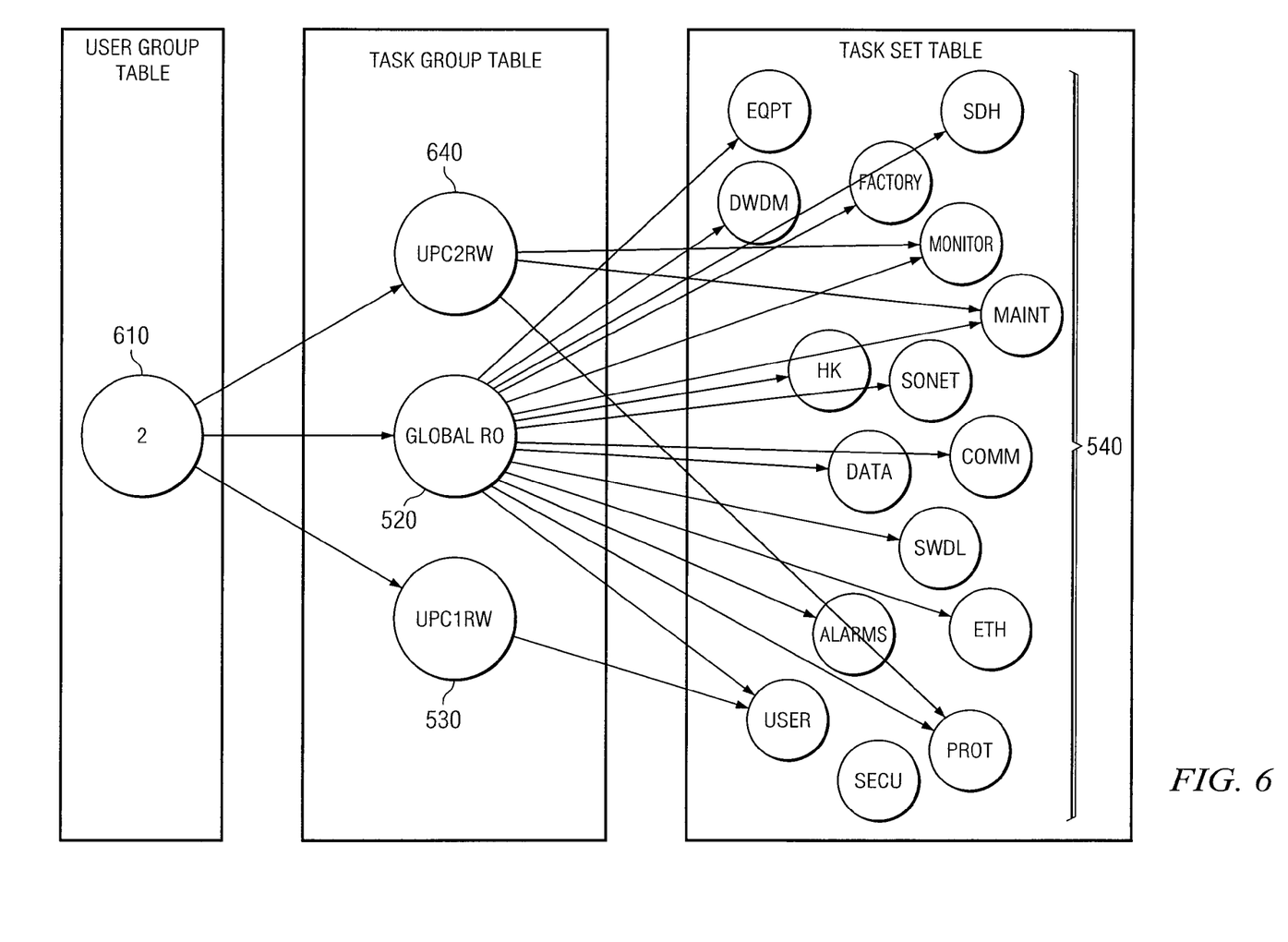
FIG. 6 illustrates one embodiment of how UPC security level 2 may be implemented using a role based security model.

FIG. 6 illustrates one embodiment of how UPC security level 2 may be implemented using a role based security model. In some embodiments, the associations between user group 610, task groups 520, 530, and 640 as well as task set collection 540 implement UPC security level 2. Users, in certain embodiments, that are to be identified with UPC security level 2 may be associated with user group 610. Users that have UPC level 2 access should have access to all the telecom network commands in telecom network 100 that users that have UPC level 1 access and well as access to other telecom network commands according to particular embodiments. Thus, in some embodiments, users in user group 610 are associated with the same task groups users in user group 510:

task groups 520 and 530. Further, in various embodiments, users associated with UPC security level 2 may also have read-write access to different telecom network commands. Thus, user group 610 is also associated with another task group, task group 640, which grants read-write access to certain task sets within task set collection 540.

Figure 7:
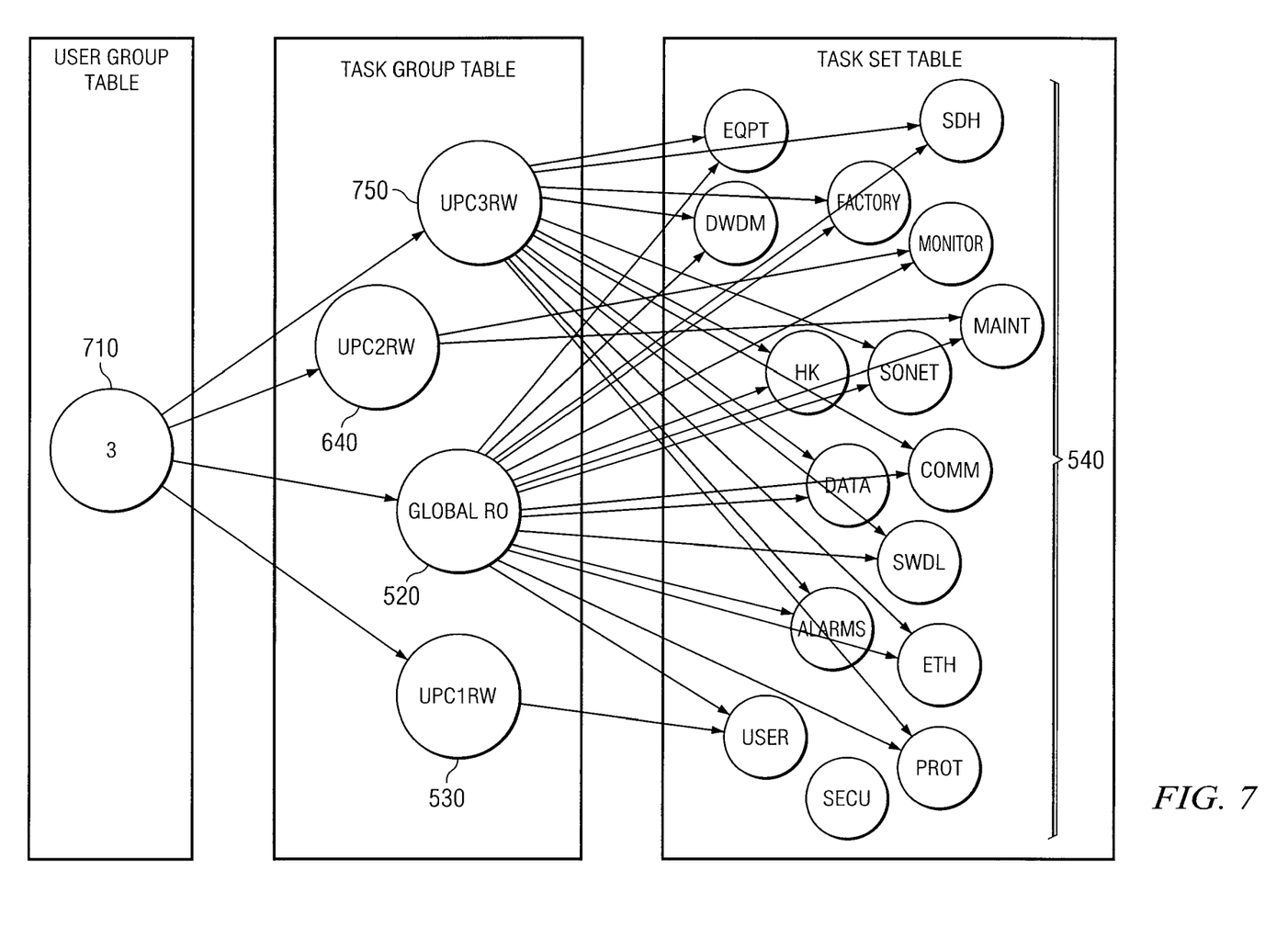
FIG. 7 illustrates one embodiment of how UPC security level 3 may be implemented in a role based security model.

FIG. 7 depicts, in some embodiments, how UPC security level 3 may be implemented in a role based security model. Users with UPC security level access may, in some embodiments, be placed in user group 710. In some embodiments, users associated with UPC security level 3 are granted access to all the telecom network commands that users granted UPC security level 1 and UPC security level 2 access have. Thus, in various embodiments, user group 710 is associated with task groups 520 and 530 (those task groups associated with user group 510) as well as task group 640 (the additional task group to which user group 610 was associated with). In addition, in various embodiments user granted UPC security level 3 access also have access to telecom network commands in telecom network 100 that users in UPC security level 2 and security level 1 do not have access to. Thus, in particular embodiments, user group 710 is associated with task group 750 which grants read-write access to various task sets in task set collection 540.

Figure 8:
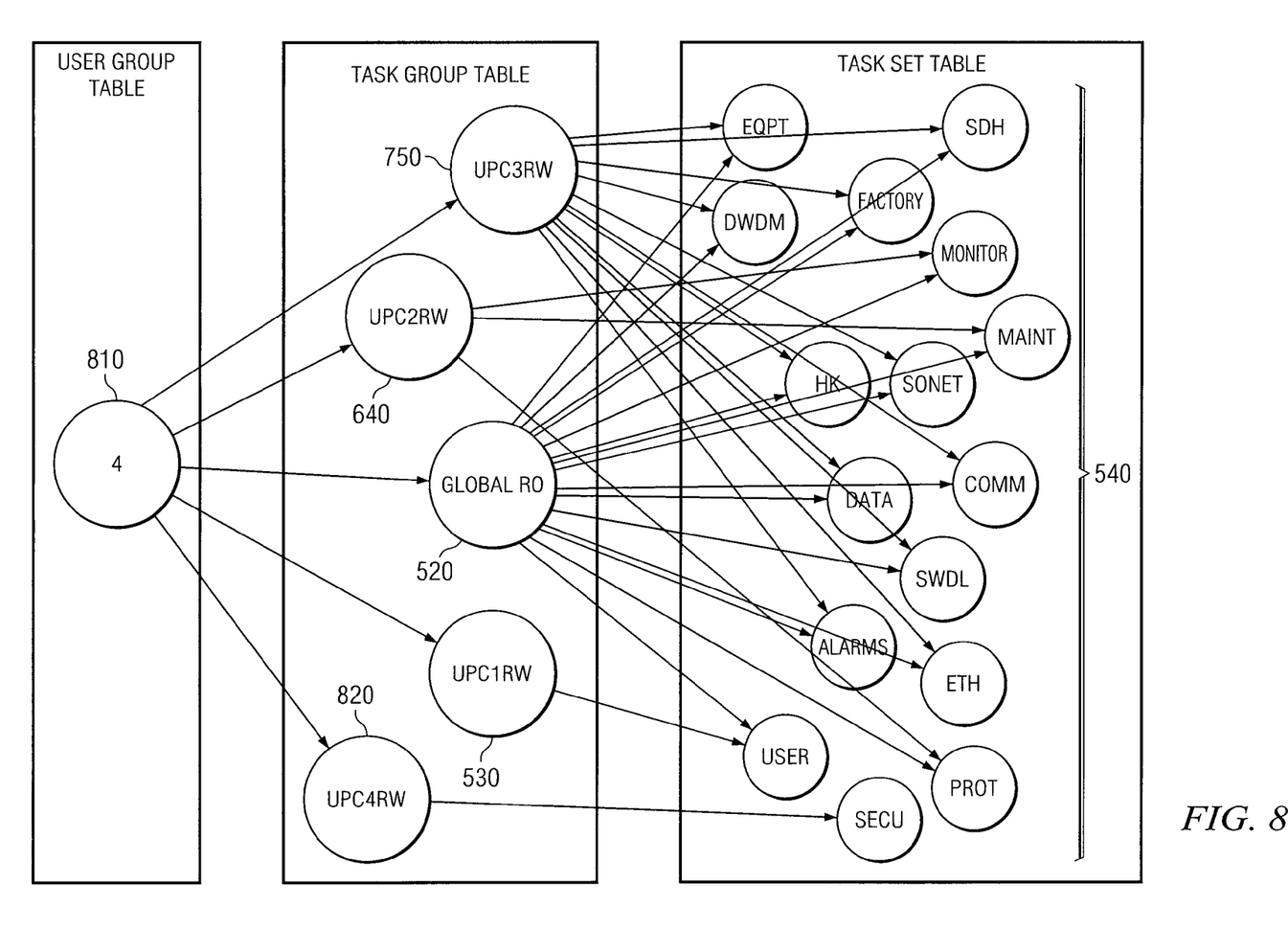
FIG. 8 illustrates one embodiment of how UPC security level 4 may be implemented in a role based security model.

FIG. 8 illustrates, in some embodiments, associations between user group 810 task groups 820, 520, 530, 640, and 750 as well as task set collection 540 which implement UPC security level 4. Users with UPC security level 4 access, in certain embodiments may be associated with user group 810. Users granted UPC level 4 access also have access to telecom network commands in telecom network 100 that users in the other UPC levels have access to. Thus, in some embodiments, user group 810 may be associated with task groups 520 and 530 (which are the task groups that users with UPC level 1 access are associated with), task group 640 (the additional task group users with UPC security level 2 access are associated with), and task group 750 (the additional task group that users with UPC security level 3 access are associated with). In addition, in some embodiments, users granted UPC security level 4 also have access to telecom network commands in telecom network 100 that other users in other UPC security levels do not have access to. Thus, in various embodiments, user group 810 is also associated with task group 820 which provides users and user group 810 access to other telecom network commands in telecom network 100.

In some embodiments, the role-based security model described above may be implemented in TL-1. This may be advantageous because it may ease deployment in existing architectures. It may also provide backwards compatibility, in certain embodiments. As an example only, a TL-1 command to create a user group may be implemented as:

ENT-UG-SECU:[<TID>]::<CTAG>::<UG-NAME>:
[KEYWORD=DOMAIN>]

"ENT-UG-SECU" is the name of the command. "<TID>" is an identifier associated with the system in which the user group is created. "<CTAG>" is the confirmation number. "<UG-NAME>" is the name of the new user group. "<KEYWORD=DOMAIN>" is used to place the names of the task groups to which the user group is associated with. Further, a task group may be defined using the following example TL-1 command:

ENT-TG-SECU:[<TID.]::<CTAG>::<TG-NAME>:
[<KEYWORD=DOMAIN>]

"ENT-TG-SECU" is the name of the command. "<TID>" is an identifier associated with the system in which the task group is created. "<CTAG>" is the confirmation number. "<TG-NAME>" is the name of the new task group. "<KEYWORD=DOMAIN>" is used to place the names of the task sets to which the task group is associated with. Thus, telecom network commands associated with adding, modifying, and deleting user groups, task groups, and task sets may be implemented using TL-1 telecom network commands, as the above examples demonstrate.

Although several embodiments have been illustrated and described in detail, it will be recognized that modifications and substitutions are possible without departing from the spirit and scope of the appended claims.

What is claimed is:

1. A method of securing a telecom network, the operation of the telecom network controlled using a plurality of telecom network commands, comprising:
  grouping at least some of the plurality of telecom network commands into a plurality of different task sets with each task set comprising one or more telecom network commands, the telecom network commands in a particular task set being associated with a role or a portion of a role of at least one user of a plurality of users;
  grouping at least some of the plurality of task sets into a plurality of different task groups with each task group comprising a plurality of task sets, wherein at least one of the task sets is grouped into a plurality of different task groups;
  grouping at least some of the plurality of users into a plurality of different user groups;
  associating each user group to at least one of the task groups based on the role of the users in the user group, wherein at least one user group is associated with a plurality of different task groups and wherein at least one task group is associated with a plurality of different user groups; and
  allowing at least one user of the plurality of users access to at least one telecom network command of the plurality of telecom network commands based on the association of each user group to at least one of the task sets or task groups.

2. The method of claim 1, wherein the plurality of user groups comprises Usage Privilege Code groups 1 through 4.

3. The method of claim 1, wherein grouping the at least some of the plurality of task sets into the plurality of task groups further comprises assigning each task group of the plurality of task groups either read-only or read-write access to each task set within the task group.

4. The method of claim 1, wherein the plurality of telecom network commands conform to the Transaction Language 1 (TL-1) protocol.

5. A computer readable medium having computer readable instructions stored thereon, which, when executed by a processor, is operable to:
  group at least some of a plurality of telecom network commands of a telecom network into a plurality of different task sets with each task set comprising one or more telecom network commands, the telecom network commands in a particular task set being associated with a role or a portion of a role of at least one user of a plurality of users;
  group at least some of the plurality of task sets into a plurality of different task groups with each task group comprising a plurality of task sets, wherein at least one of the task sets is grouped into a plurality of different task groups;
  group at least some of the plurality of users into a plurality of different user groups;

associate each user group to at least one of the task groups based on the role of the users in the user group, wherein at least one user group is associated with a plurality of different task groups and wherein at least one task group is associated with a plurality of different user groups; and allow at least one user of the plurality of users access to at least one telecom network command of the plurality of telecom network commands based on the association of each user group to at least one of the task sets or task groups.

6. The computer readable medium of claim 5, wherein the plurality of user groups comprises Usage Privilege Code groups 1 through 4.

7. The computer readable medium of claim 5, wherein grouping the plurality task sets into the plurality of task groups further comprises allowing each task group of the plurality of task groups either read-only or read-write access to each task set within the task group.

8. The computer readable medium of claim 5, wherein the plurality of telecom network commands conform to the Transaction Language 1 (TL-1) protocol.

9. An apparatus coupled to a telecom network, comprising:
a memory comprising:
   a user list which comprises a plurality of users of the telecom network;
   a user group list which comprises a plurality of user groups wherein each user group comprises at least one user of the plurality of users;
   a command list which comprises a plurality of telecom network commands of the telecom network;
   a task set list which comprises a plurality of task sets wherein each task set comprises at least one telecom network command, the telecom network commands in a particular task set being associated with a role or a portion of a role of at least one user of a plurality of users; and
   a task group list which comprises a plurality of task groups wherein each task group comprises at least one association to a plurality of task sets and at least one association to at least one user group, wherein at least one of the task sets is associated with a plurality of different task groups, wherein at least one user group is associated with a plurality of different task groups, and wherein at least one task group is associated with a plurality of different user groups; and
a processor configured to:
   receive a request to access a first telecom network command of the plurality of telecom network commands from a first user of the plurality of users of the telecom network;
   identify a first set of user groups from the plurality of user groups which comprises the first user;
   identify a first set of task sets from the plurality of task sets wherein each task set of the first set of task sets is associated with at least one user group of first set of user groups, wherein the processor is further configured to identify the first set of task sets by:
     identifying a first set of task groups from the plurality of task groups wherein each task group in the set of task groups is associated with at least one user group of the first set of user groups; and
     identifying the task sets associated with each task group of the first set of task groups; and
   allow the first user access to the first telecom network command if the first set of task sets comprises the first telecom network command.

10. The apparatus of claim 9, wherein the plurality of user groups comprises Usage Privilege Code groups 1 through 4.

11. The apparatus of claim 9, wherein the at least one association between a task group and a task set may be a read-only association or a read-write association.

12. The apparatus of claim 9, wherein the plurality of telecom network commands conform to the Transaction Language 1 (TL-1) protocol.

* * * * *